United States Patent [19]
Hashimoto et al.

[11] Patent Number: 5,178,588
[45] Date of Patent: Jan. 12, 1993

[54] PARKING GEAR MOUNTING STRUCTURE FOR AUTOMATIC TRANSMISSION

[75] Inventors: Masayuki Hashimoto, Shizuoka; Kazuyoshi Iwanaga; Noboru Hattori, both of Kanagawa, all of Japan

[73] Assignee: Jatco Corporation Nissan Motor Company, Ltd., Japan

[21] Appl. No.: 811,908

[22] Filed: Dec. 23, 1991

Related U.S. Application Data

[63] Continuation of Ser. No. 454,384, Dec. 21, 1989, abandoned.

Foreign Application Priority Data

Dec. 26, 1988 [JP] Japan .................. 63-168681[U]

[51] Int. Cl.$^5$ ............................................. F16H 47/08
[52] U.S. Cl. .................................... 475/331; 475/285
[58] Field of Search ............... 475/205, 280, 285, 284, 475/329, 330, 331, 337, 900, 47, 54, 57, 60, 323, 59; 192/4 A; 74/411.5

[56] References Cited

U.S. PATENT DOCUMENTS

| | | | |
|---|---|---|---|
| 2,488,660 | 11/1949 | Conkle | 475/329 |
| 2,667,085 | 1/1954 | Ackerman | 475/284 X |
| 2,822,706 | 2/1958 | Miller | 475/284 |
| 3,020,781 | 2/1962 | Burnett | 192/4 A |
| 3,053,115 | 9/1962 | Cartwright et al. | 475/285 X |
| 3,077,115 | 2/1963 | Chapman, Jr. | 475/285 X |
| 3,233,478 | 2/1966 | General et al. | 475/285 X |
| 3,539,039 | 11/1970 | Chana | 192/4 A |
| 3,631,947 | 1/1972 | Laing | 475/331 X |
| 4,798,103 | 1/1989 | Eastman et al. | 475/312 X |
| 5,055,098 | 10/1991 | Umebayashi et al. | 475/312 |

FOREIGN PATENT DOCUMENTS 0045146  3/1986  Japan .................. 192/4 A

Primary Examiner—Leslie A. Braun
Assistant Examiner—Khoi Q. Ta
Attorney, Agent, or Firm—Ronald P. Kananen

[57] ABSTRACT

A parking gear mounting structure for an automatic transmission includes an input shaft which is supported by a transmission case in such a manner as to be prevented from moving radially with respect to an axis of the input shaft, an output shaft which is arranged coaxially with the input shaft and is also supported by the transmission case in such a manner as to be prevented from moving radially with respect to an axis of the output shaft, and a planetary gearset provided between the input shaft and the output shaft. The planetary gearset has a pinion carrier which is provided with a parking gear in a fixed relationship thereto. The parking gear is engageable with a parking gear locking member for locking the parking gear when the transmission is in parking. The pinion carrier is mounted onto the output shaft to rotate as a unit with the output shaft. A connecting member is provided for transmitting driving power from the input shaft to the planetary gearset. The connecting member is in a fixed relationship to the input shaft. A bearing is arranged between the pinion carrier and the connecting member such that the pinion carrier is radially supported by the connecting member through the bearing to prevent a radial displacement of the pinion carrier with respect to the axis of the output shaft.

16 Claims, 3 Drawing Sheets

FIG. 3

|  | REV/C | H/C | FWD/C | OVR/C | L&R/B | LOW O.W.C | FWD O.W.C | B/B | D/C | RDCN/B | RDCN O.W.C | S/A | S/R | OD S/A |
|---|---|---|---|---|---|---|---|---|---|---|---|---|---|---|
| 1ST |  |  | ○ | ⊗ | ◎ | ▨ | ▨ |  |  | ◎ | ▨ |  |  |  |
| 2ND |  |  | ○ | ○ |  |  | ▨ | ○ |  | ◎ | ▨ | ○ |  |  |
| 3RD |  | ○ | ○ | ○ |  |  | ▨ |  |  | ◎ | ▨ | ⊗ | ○ |  |
| 4TH |  | ○ | ○ | ○ |  |  | ▨ | ○ | ○ |  |  | ⊗ | ○ |  |
| 5TH |  | ○ | ⊗ |  |  |  |  |  | ○ |  |  | ⊗ | ⊗ | ○ |
| REV | ○ |  |  |  | ○ |  |  |  |  | ○ |  |  |  |  |

PARKING GEAR MOUNTING STRUCTURE FOR AUTOMATIC TRANSMISSION

This application is a continuation of application Ser. No. 07/454,384 filed Dec. 21, 1989, now abandoned.

BACKGROUND OF THE INVENTION

1. Field of the Invention

This invention relates generally to a parking gear mounting structure for an automatic transmission and; more specifically, to a parking gear mounting structure that can provide a precise centering, with respect to an axis of an output shaft of the transmission, of a pinion carrier having a parking gear in a fixed relationship thereto, so as to securely prevent a radial displacement of the pinion carrier when the parking gear engages with a parking pawl provided at a side of a transmission case.

2. Description of the Background Art

There is known a parking gear mounting structure for an automatic transmission, such as disclosed in Second Japanese Patent Publication No. 56-44304.

In this known structure, a parking gear is mounted to a reduction gear unit of a sub-transmission having a final output shaft, which sub-transmission is mounted at an output side of a main transmission, for providing a compact sub-transmission structure. Specifically, the parking gear is integrally formed with a pinion carrier of the reduction gear unit and is engageable with a parking pawl provided at a side of a transmission case for locking the final output shaft to the transmission case when the transmission is in a parking position. The pinion carrier and the final output shaft are connected to each other by a spline connection. Specifically, the pinion carrier has a boss portion which receives the final output shaft therethrough. An inner periphery of the pinion carrier boss portion is formed with a plurality of radially inward and outward protruding portions with respect to an axis of the final output shaft, and an outer periphery of the final output shaft is also formed with a plurality of corresponding radially outward and inward protruding portions for engagement with the corresponding radially inward and outward protruding portions of the pinion carrier boss portion. Each radially inward or outward protruding portion extends in a direction along the axis of the final output shaft so as to transmit the driving power from the engine to the final output shaft through the pinion carrier. Accordingly, in this known structure, a positioning of the pinion carrier in a radial direction with respect to the axis of the final output shaft is performed substantially only by the spline connection between the pinion carrier boss portion and the final output shaft.

The final output shaft has a forward tip portion of a smaller diameter which is coaxially inserted into an axial bore formed at a rearward end portion of an intermediate output shaft of the main transmission and is supported by a bearing disposed between an outer periphery of the smaller diameter forward tip portion of the final output shaft and an inner periphery of the rearward end portion of the intermediate output shaft of the main transmission. On an outer periphery of the rearward end portion of the intermediate output shaft is mounted a connecting member by a spline connection which is substantially the same in structure as described above. The connecting member works to mechanically connect the intermediate output shaft of the main transmission to the reduction gear unit of the sub-transmission. Further, another bearing is disposed between the rearward side of the connecting member and the forward side of the pinion carrier so as to restrain displacement of the pinion carrier in a direction along the axis of the final output shaft or that of the coaxial intermediate transmission output shaft.

In this known parking gear mounting structure, however, as described above, the radial positioning or the centering of the pinion carrier having the integral parking gear with respect to the axis of the final output shaft is performed substantially solely by the spline connection as mentioned above. Because substantial backlash is provided in the spline connection, the pinion carrier is forced to move radially relative to the final output shaft due to a biasing force applied to the parking gear when the parking gear engages with the parking pawl, depending on a magnitude of the backlash in the spline connection. As a result, the engagement between the parking gear and the parking pawl is likely to become unreliable and further, an unexpected excessive force is likely to exerted onto pinions supported by the pinion carrier to deteriorate durability of the reduction gear unit.

Further, the forward tip portion of the final output shaft has to be formed smaller in diameter to be inserted into the axial bore of the intermediate output shaft, and the wall of the rearward end portion of the intermediate output shaft defining the axial bore has to be formed smaller in thickness due to the spline connection with the connecting member. Thus, structural strength of the associated elements for supporting the pinion carrier becomes inevitably less, which also impairs the durability of the associated elements.

SUMMARY OF THE INVENTION

Accordingly, it is an object of the present invention to provide a parking gear mounting structure for an automatic transmission that can eliminate the above-noted defects inherent in the known structure.

It is another object of the present invention to provide a parking gear mounting structure for an automatic transmission that can ensure a reliable engagement between a parking gear which is provided at a pinion carrier in a fixed relationship thereto, and a parking pawl provided at a side of a transmission case, and thus that can also prevent an excessive load from exerting onto associated gear elements such as pinions supported by the pinion carrier to damage same.

It is a further object of the present invention to provide a parking gear mounting structure for an automatic transmission that can improve structural strength of associated elements for supporting a pinion carrier having a parking gear in a fixed relationship thereto.

To accomplish the above-mentioned and other objects, according to one aspect of the present invention, a parking gear mounting structure for an automatic transmission comprises an input shaft for transmitting driving power from an engine, the input shaft supported by a transmission case in such a manner as to be prevented from moving radially with respect to an axis of the input shaft, an output shaft provided coaxially with the input shaft for receiving the driving power through a planetary gearset having a pinion carrier, the pinion carrier mounted on the output shaft to rotate as a unit with the output shaft and having in a fixed relationship thereto a parking gear which is engageable with parking gear locking means when the transmission is in a parking position, the output shaft supported by the transmission case in such a manner as to be prevented from moving radially with respect to an axis of the output shaft, a connecting member provided between the input shaft and the planetary gearset for transmitting the driving power from the input shaft to the planetary gearset, the connecting member being in a fixed relationship to the input shaft, and bearing means provided between the pinion carrier and the connecting member such that the pinion carrier is radially supported by the connecting member through the bearing means to prevent a radial displacement of the pinion carrier with respect to the axis of the output shaft.

Preferably, the parking gear is formed integral with the pinion carrier, and the connecting member is formed integral with the input shaft.

BRIEF DESCRIPTION OF THE DRAWINGS

The present invention will be understood more fully from the detailed description given hereinbelow and from the accompanying drawings of the preferred embodiment of the invention, which are given by way of example only, and are not intended to be limitative of the present invention.

In the drawings:

FIG. 3 is a chart showing an operational relationship among control elements of the automatic transmission of FIG. 2 for providing respective five forward drives and one reverse drive.

DESCRIPTION OF THE PREFERRED EMBODIMENT

A preferred embodiment of a parking gear mounting structure for an automatic transmission according to the present invention will be described with reference to FIGS. 1 to 3.

Figure 2:
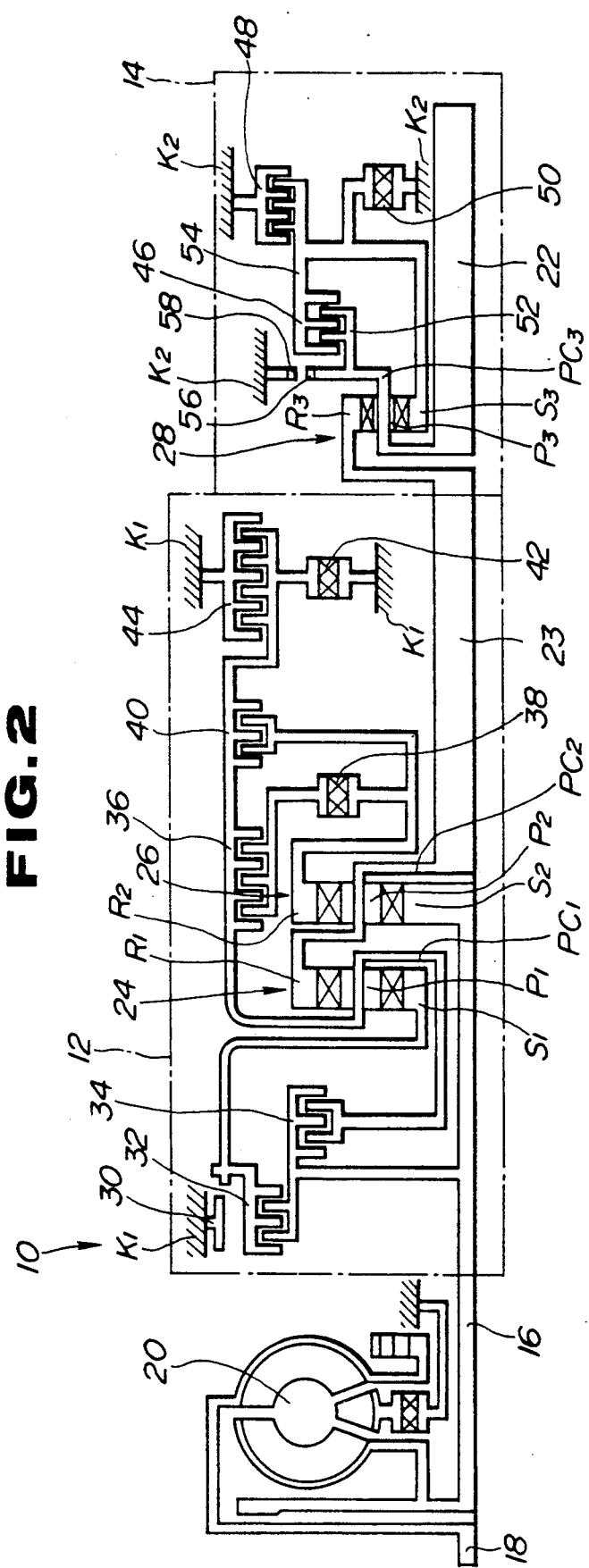
FIG. 2 is a skeleton view showing an upper half of the entire automatic transmission of FIG. 1, having a main transmission and a sub-transmission.

In FIG. 2, an automatic transmission 10 includes a gear train for providing five forward speed ratios and one reverse speed ratio. Specifically, the transmission 10 has a main transmission 12 having a gear train adapted to provide four forward speed ratios and one reverse speed ratio, which is combined with a sub-transmission 14 having an additional planetary gearset so as to provide the five forward speed ratios and one reverse speed ratio.

The transmission 10 includes an input or turbine shaft 16 connected to a crank or output shaft 18 of an internal combustion engine (not shown) through a torque converter 20. The transmission 10 further includes an output shaft 22 for transmitting the driving torque from the engine to a final drive. An output shaft 23 of the main transmission 12 works as an intermediate output shaft for transmitting the output of the main transmission 12 to the sub-transmission 14. The torque converter 20 includes, in a known manner, a pump impeller, a turbine runner and a stator. The pump impeller is connected to the engine output shaft 18, while the turbine runner is connected to the input shaft 16. The pump impeller is also connected to an oil pump. Between the input shaft 16 and the output shaft 22 are provided a first planetary gearset 24, a second planetary gearset 26 and a third planetary gearset 28, each working as a simple planetary gear system. The first planetary gearset 24 includes a sun gear $S_1$, pinions $P_1$, a ring gear $R_1$ and a pinion carrier $PC_1$ supporting the pinions $P_1$. Similarly, the second planetary gearset 26 includes a sun gear $S_2$, pinions $P_2$, a ring gear $R_2$ and a pinion carrier $PC_2$ supporting the pinions $P_2$. The third planetary gearset 28 also includes a sun gear $S_3$, pinions $P_3$, a ring gear $R_3$ and a pinion carrier $PC_3$ supporting the pinions $P_3$.

The transmission 10 further includes a brake band (B/B) 30, a reverse clutch (REV/C) 32, a high clutch (H/C) 34, a forward clutch (FWD/C) 36, a forward one-way clutch (FWD O.W.C) 38, an overrun clutch (OVR/C) 40, a low one-way clutch (LOW O.W.C) 42, a low and reverse brake (L&R/B) 44, a direct clutch (D/C) 46, a reduction brake (RDCN/B) 48 and a one-way reduction clutch (RDCN O.W.C) 50, operating as control elements for controlling the first to third planetary gearsets 24 to 28 so as to provide the five forward speed ratios and one reverse speed ratio.

The input shaft 16 and the sun gear $S_1$ are connected through the reverse clutch 32. Specifically, the reverse clutch 32 operates to connect the input shaft 16 to the sun gear $S_1$ when it is engaged, and disconnect them when it is released. Similarly, the input shaft 16 is also connected to the pinion carrier $PC_1$ through the high clutch 34. The pinion carrier $PC_1$ is further connected to the ring gear $R_2$ of the second planetary gearset 26 through the forward clutch 36 and the forward one-way clutch 38 which clutches are arranged in series. Further, the pinion carrier $PC_1$ is connected to the ring gear $R_2$ through the overrun clutch 40 which is arranged in parallel with the forward one-way clutch 38. The low and reverse brake 44 works to fix the pinion carrier $PC_1$ to a transmission case $K_1$ of the main transmission 12 when it is engaged. Similarly, the brake band 30 can fix the sun gear $S_1$ to the transmission case $K_1$ when it is engaged. The low one-way clutch 42 permits the pinion carrier $PC_1$ to rotate in one direction but not in the other. The sun gear $S_2$ of the second planetary gearset 26 is constantly connected to the input shaft 16, while the ring gear $R_1$ of the first planetary gearset 24 and the pinion carrier $PC_2$ of the second planetary gearset 26 are integrally connected to each other. The pinion carrier $PC_2$ is constantly connected to the intermediate output shaft 23 which is further constantly connected to the ring gear $R_3$ of the third planetary gearset 28 in the sub-transmission 14. The pinion carrier $PC_3$ of the third planetary gearset 28 is constantly connected to the output shaft 22. The pinion carrier $PC_3$ is also connected to the sun gear $S_3$ through the direct clutch 46 in the form of a multi-disc clutch. The direct clutch 46 is adapted to connect the $PC_3$ and a clutch hub 52 to a clutch drum 54 to which the sun gear $S_3$ is connected, when it is engaged. The reduction brake 48 fixes the clutch drum 54 to a sub-transmission case $K_2$ of the sub-transmission 14. The one-way reduction clutch 50 allows the clutch drum 54 to rotate in one direction but not in the other.

A parking gear 56 is integrally formed on the radially outer periphery of the pinion carrier $PC_3$, the radially outer periphery facing the sub-transmission case $K_2$. On the other hand, a parking pawl 58 is provided at a side of the sub-transmission case $K_2$ for locking the pinion carrier $PC_3$, that is, the output shaft 22 to the sub-transmission case $K_2$, when a selector lever for the transmission is in a parking position.

The foregoing control elements are selectively operated by hydraulic pressure from a control valve unit (not shown) which is generally provided at the bottom of the transmission case. As shown in FIG. 3, the five forward speed ratios and one reverse speed ration can be obtained by selectively engaging or releasing the control elements. In FIG. 3, ◯ denotes that a corresponding control element is in a released state. ⊙ denotes that a corresponding control element is engaged only while an accelerator opening angle is at 1/16 or less, where the engine braking is effected. ● denotes that a corresponding control element is engaged only during acceleration. ⊗ denotes that a corresponding control element is engaged, but not to affect the power transmission. ⊗ denotes that a corresponding control element is engaged only while an accelerator opening angle is at 1/16 or less, but not to provide the engine braking. As seen in the chart of FIG. 3, the brake band (B/B) 30 is in practice engaged or released through a hydraulic band servo including a second speed servo apply chamber (S/A), a servo release chamber (S/R) and a fifth speed servo apply chamber (OD S/A). For example, when pressure is applied to the second speed servo apply chamber (S/A), the brake band is applied. Under this condition, if pressure is applied to the servo release chamber (S/R), the brake band is released. Subsequently, when pressure is applied to the fifth speed servo apply chamber (OD S/A), the brake band is engaged again.

Figure 1:
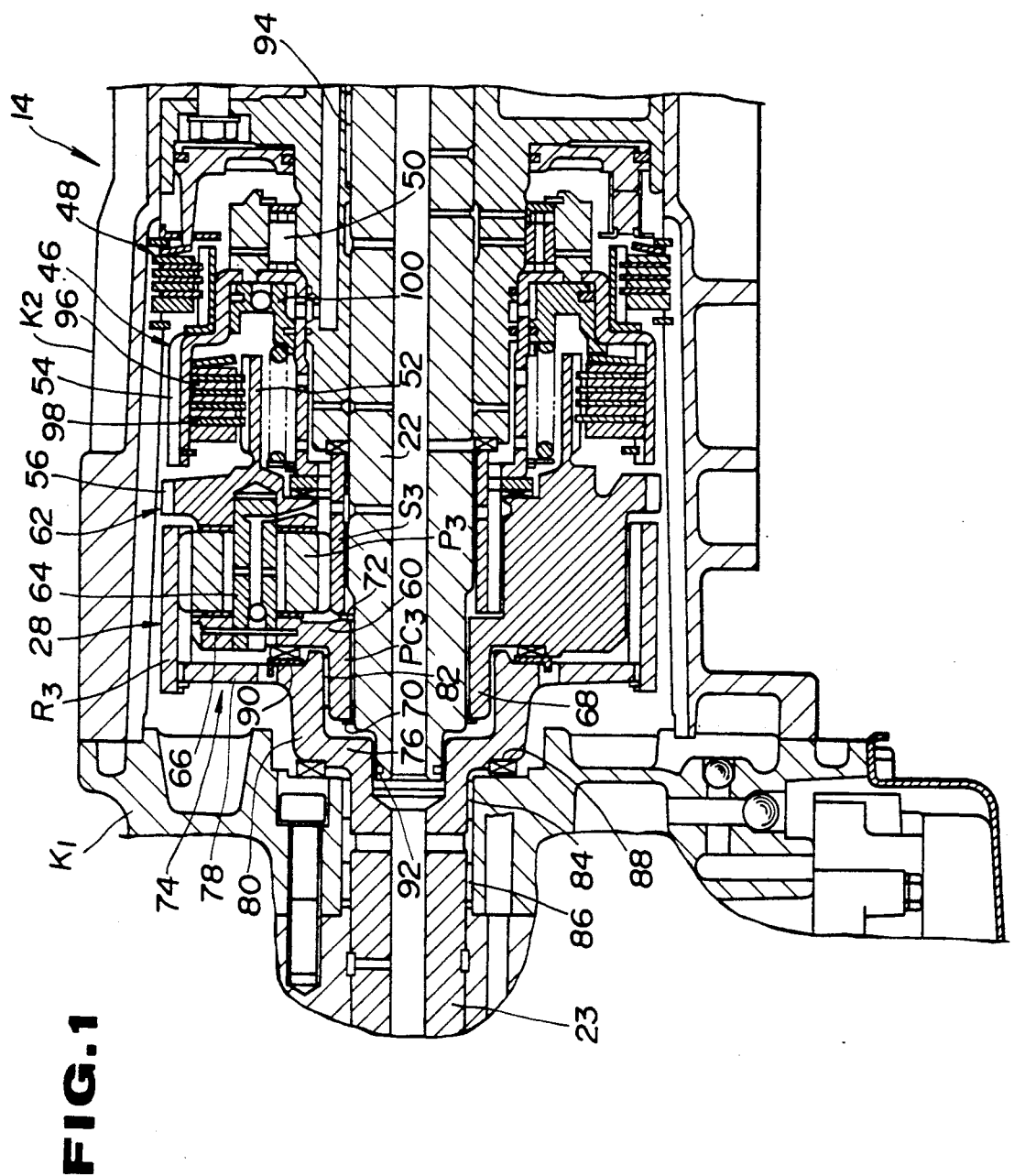
FIG. 1 is a longitudinal sectional view showing a portion of an automatic transmission, wherein a parking gear mounting structure according to a preferred embodiment of the present invention is incorporated.

Referring now to FIG. 1, there is shown a detailed structure of the sub-transmission 14. The pinion carrier $PC_3$ has a first section 60, a second section 62 and shaft sections 64 each fixedly connecting the first and second sections 60 and 62. Each shaft section 64 is fixed to the first section 60 by a pin 66 at its one end and is fixedly fitted into the second section 62 at its other end, and rotatably supports a pinion $P_3$. The first section 60 has at its inner end a boss portion 68 which is mounted onto the output shaft 22 by means of a spline connection 69. Specifically, an inner periphery of the pinion carrier boss portion 68 is formed with a plurality of radially inward and outward protruding portions with respect to an axis of the output shaft 22, and an outer periphery of the output shaft 22 is also formed with a plurality of corresponding radially outward and inward protruding portions for engagement with the corresponding radially inward and outward protruding portions of the pinion carrier boss portion 68. Each radially inward or outward protruding portion extends in a direction along the axis of the output shaft 22. Snap rings 70 and 72 are disposed at opposite axial ends of the pinion carrier boss portion 68 to attain the axial positioning of the first section 60, that is, the pinion carrier $PC_3$. The radially outer periphery of the second section 62 faces the sub-transmission case $K_2$ and is integrally formed with the parking gear 56. The parking gear 56 is adapted to engage with the parking pawl 58 shown in FIG. 2 to lock the pinion carrier $PC_3$, that is, the output shaft 22 to the sub-transmission case $K_2$ when the selector lever for the transmission is manually selected into the parking position.

Between the intermediate output shaft 23 of the main transmission 12 and the ring gear $R_3$ of the sub-transmission 14, there is provided a connecting member 74 for transmitting the output of the main transmission 12 to the ring gear $R_3$ of the sub-transmission. The connecting member 74 is integrally formed with the intermediate output shaft 23 at its rearward end and includes a first flange portion 76 extending radially outward from the rearward end of the intermediate output shaft 23, a second flange portion 78 axially offset from the first flange portion 76 in the rearward direction and extending radially outward to be fixedly connected to the ring gear $R_3$, and a tubular portion 80 axially extending to connect the first and second flange portions 76 and 78.

Between an inner periphery of the tubular portion 80 and an outer periphery of the boss portion 68 of the pinion carrier $PC_3$, there is provided a bearing 82 which axially overlaps with the spline connection 69 between the boss portion 68 and the output shaft 22, so as to accomplish positioning of the pinion carrier $PC_3$ in a radial direction relative to the axis of the output shaft 22. The intermediate output shaft 23 is, at its rearward end portion just forward of the integrally formed connecting member 74, securely supported by the main-transmission case $K_1$ through a pair of bearings 84 and 86. Further, bearings 88 and 90 are provided between the first flange portion 76 of the connecting member 74 and the main transmission case $K_1$ and between the second flange portion 78 of the connecting member 74 and the first section 60 of the pinion carrier $PC_3$, so as to provide axial positioning thereof.

The intermediate output shaft 23 is formed at its rearward end portion with an axial bore which is formed larger in diameter at its rearward end for receiving a forward tip portion of the output shaft 22. The forward tip portion of the output shaft 22 is formed smaller in diameter and is axially inserted into the larger diameter rearward end of the axial bore such that a very small radial gap is provided between an inner periphery of the larger diameter rearward end of the axial bore and an outer periphery of the smaller diameter forward tip portion of the output shaft 22. A seal ring 92 is disposed in the radial gap which is formed with a slit (not shown) for allowing a portion of lubricant supplied through the axial bore to pass therethrough. The lubricant passing through the seal ring slit then flows into between the boss portion 68 of the pinion carrier $PC_3$ and the tubular portion 80 of the connecting member 74 for lubricating the bearing 82, and further flows into between the first section 60 of the pinion carrier $PC_3$ and the second flange portion 78 of the connecting member 74 for lubricating the bearing 90.

The output shaft 22 is supported at its intermediate portion by the sub-transmission case $K_2$ through a bearing 94 and is further supported at its rearward end portion (not shown) by the sub-transmission case $K_2$ through another bearing (not shown).

As shown in FIG. 1, the multiple-disc clutch 46 is arranged adjacent to the third planetary gearset 28. The multiple-disc clutch 46 is of a wet type and includes the clutch hub 52, the clutch drum 54, clutch plates 96, clutch discs 98 and a hydraulically operated piston 100. The clutch hub 52 is formed integral with the second section 62 of the pinion carrier $PC_3$.

In the parking gear mounting structure according to the preferred embodiment as described above, the parking gear 56 is formed integral with the pinion carrier $PC_3$, and the boss portion 68 of the pinion carrier $PC_3$ is supported by the connecting member 74 through the bearing 82 disposed between the outer periphery of the boss portion 68 and the inner periphery of the connecting member 74. The connecting member 74 is integrally formed with the intermediate output shaft 23 which is supported by the main transmission case $K_1$ through the bearings 84 and 86. Accordingly, the pinion carrier $PC_3$ is precisely centered with respect to the axis of the output shaft 22 and is securely prevented from moving radially by means of the bearing connection between the boss portion 68 of the pinion carrier PC3 and the connecting member 74. When the selector lever for the transmission is selected into the parking position to establish the engagement between the parking gear 56 and the parking pawl 58, the biasing force generated by their engagement and applied to the pinion carrier PC3 through the parking gear 56 is prevented from moving the pinion carrier PC3 in the radial direction because the pinion carrier PC3 is securely supported by the main transmission case K1 in the radial direction through the bearing 82, the connecting member 74, the intermediate output shaft 23 and the bearings 84 and 86. Accordingly, the backlash provided in the spline connection between the output shaft 22 and the boss portion 68 of the pinion carrier has no influence to the radial displacement of the pinion carrier. Therefore, the secure engagement between the parking gear 56 and the parking pawl 58 is always ensured to prevent damage of the associated gears such as the pinions P3.

Further, because the bearing 82 is axially overlapped with the spline connection between the boss portion 68 of the pinion carrier PC3 and the output shaft 22, the axial length of the associated elements can be shortened.

Still further, because the pinion carrier PC3 is supported by the connecting member 74 in the axial direction through the bearing 90 having a large diameter, a sufficiently large bearing capacity is ensured. Further, because the connecting member 74 is formed integral with the intermediate output shaft 23 in this preferred embodiment, the rearward end wall of the intermediate output shaft 23 defining the axial bore is maintained thick in comparison with the foregoing known structure.

It is to be understood that this invention is not to be limited to the embodiments described above, and that various changes and modifications may be made without departing from the spirit and scope of the invention as defined in the appended claims. For example, though the preferred embodiment was described with respect to a transmission for an F-R (front-engine rear-drive) vehicle, the present invention is equally applicable to transmissions for, such as, an F-F (front-engine front-drive) vehicle and a 4WD (four-wheel drive) vehicle.

What is claimed is:

1. A planetary gearset mounting structure for an automatic transmission comprising:
    an input shaft for transmitting driving power from an engine, said input shaft supported by a transmission case so as to be prevented from moving radially with respect to an axis of said input shaft;
    an output shaft provided coaxially with said input shaft for receiving said driving power through a planetary gearset having a pinion carrier, said pinion carrier mounted to said output shaft through connecting means so as to rotate with said output shaft and having in a fixed relationship thereto a parking gear which is engageable with parking gear locking means when the transmission is in a parking position, said output shaft supported by the transmission case so as to be prevented from moving radially with respect to an axis of the output shaft;
    a connecting member provided between said input shaft and a rotational member of said planetary gearset other than said pinion carrier for transmitting said driving power from the input shaft to said rotational member, said connecting member being in a fixed relationship to said input shaft; and
    bearing means provided between said pinion carrier and said connecting member such that said pinion carrier is radially supported by said connecting member through said bearing means to prevent a radial displacement of said pinion carrier with respect to the axis of said output shaft, said radial displacement of said pinion carrier being otherwise caused due to said connecting means.

2. A planetary gearset mounting structure for an automatic transmission comprising:
    an input shaft for transmitting driving power from an engine, said input shaft supported by a transmission case so as to be prevented from moving radially with respect to an axis of said input shaft;
    an output shaft provided coaxially with said input shaft for receiving said driving power through a planetary gearset having a pinion carrier, said pinion carrier mounted on said output shaft so as to rotate with said output shaft and having in a fixed relationship thereto a parking gear which is engageable with parking gear locking means when the transmission is in a parking position, said output shaft supported by the transmission case so as to be prevented from moving radially with respect to an axis of the output shaft;
    a connecting member provided between said input shaft and a rotational member of said planetary gearset other than said pinion carrier for transmitting said driving power from the input shaft to said rotational member, said connecting member being in a fixed relationship to said input shaft;
    bearing means provided between said pinion carrier and said connecting member such that said pinion carrier is radially supported by said connecting member through said bearing means to prevent a radial displacement of said pinion carrier with respect to the axis of said output shaft; wherein
    said pinion carrier has a boss portion extending axially and receiving said output shaft therethrough, and said connecting member has a tubular portion extending axially and receiving said boss portion therein, said bearing means disposed between an outer periphery of said boss portion and an inner periphery of said tubular portion.

3. A planetary gearset mounting structure as set forth in claim 2, wherein said boss portion of the pinion carrier and said output shaft are connected by a spline connection between an inner periphery of said boss portion and an outer periphery of said output shaft, and said bearing means is arranged to axially overlap with said spline connection.

4. A planetary gearset mounting structure as set forth in claim 2, wherein said connecting member is formed integral with said input shaft.

5. A planetary gearset mounting structure as set forth in claim 2, wherein said parking gear is formed integral with said pinion carrier.

6. A planetary gearset mounting structure as set forth in claim 2, wherein the transmission includes a main transmission and a sub-transmission, and said input shaft is an output shaft of said main transmission for transmitting the output of said main transmission to said planetary gearset of the sub-transmission.

7. A planetary gearset mounting structure as set forth in claim 2, wherein said output shaft is inserted into an axial bore formed in said input shaft with a predetermined radial gap therebetween, and a lubricant is supplied to said bearing means through said axial bore.

8. A parking gear mounting structure as set forth in claim 7, wherein a seal ring is disposed in said radial gap, said seal ring formed with a slit through which the lubricant is supplied to said bearing means.

9. A planetary gearset mounting structure for an automatic transmission comprising:
   an input shaft for transmitting driving power from an engine, said input shaft supported by a transmission case so as to be prevented from moving radially with respect to an axis of said input shaft;
   an output shaft provided coaxially with said input shaft for receiving said driving power through a planetary gearset having a pinion carrier, said pinion carrier mounted on said output shaft through connecting means which allows a co-rotation of said pinion carrier with said output shaft and further allows a radial displacement of said pinion carrier with respect to an axis of said output shaft, said pinion carrier having in a fixed relationship thereto a parking gear which is engageable with parking gear locking means when the transmission is in parking, and said output shaft being supported by the transmission case so as to be prevented from moving radially with respect to the axis of the output shaft;
   a connecting member provided between said input shaft and a rotational member of said planetary gearset other than said pinion carrier for transmitting said driving power from the input shaft to said rotational member, said connecting member being in a fixed relationship to said input shaft; and
   bearing means provided between said pinion carrier and said connecting member such that said pinion carrier is radially supported by said connecting member through said bearing means to prevent said radial displacement of said pinion carrier with respect to the axis of said output shaft.

10. A planetary gearset mounting structure as set forth in claim 1, wherein the transmission includes a main transmission and a sub-transmission, and said input shaft is an output shaft of said main transmission for transmitting the output of said main transmission to said planetary gearset of the sub-transmission.

11. A planetary gearset mounting structure as set forth in claim 2, wherein said rotational member is a ring gear to which said connecting member is fixed.

12. A planetary gearset mounting structure as set forth in claim 1, wherein said bearing means is radially mounted at a further diametrical distance from the connecting means.

13. A planetary gearset mounting structure as set forth in claim 9, wherein said bearing means is radially mounted at a further diametrical distance from the connecting means.

14. A planetary gearset mounting structure as set forth in claim 1, wherein said bearing means is provided at a given radially outward distance from said connecting means.

15. A planetary gearset mounting structure as set forth in claim 9, wherein said bearing means is provided at a given radially outward distance from said connecting means.

16. A planetary gearset mounting structure for an automatic transmission comprising:
   an input shaft for transmitting driving power from an engine, said input shaft supported by a transmission case so as to be prevented from moving radially with respect to an axis of said input shaft;
   an output shaft provided coaxially with said input shaft for receiving said driving power through a planetary gearset having a pinion carrier, said pinion carrier mounted on said output shaft so as to rotate with said output shaft and having in a fixed relationship thereto a parking gear which is engageable with parking gear locking means when the transmission is in a parking position, said output shaft supported by the transmission case so as to be prevented from moving radially with respect to an axis of the output shaft;
   a connecting member provided between said input shaft and a ring gear of said planetary gearset for transmitting said driving power from the input shaft to said ring gear, said connecting member being in a fixed relationship to said input shaft; and
   bearing means provided between said pinion carrier and said connecting member such that said pinion carrier is radially supported by said connecting member through said bearing means to prevent a radial displacement of said pinion carrier with respect to the axis of said output shaft.

* * * * *